US010052897B2

(12) United States Patent
Gonzalez Bruno et al.

(10) Patent No.: US 10,052,897 B2
(45) Date of Patent: Aug. 21, 2018

(54) ARRANGING IMAGE DATA SEGMENTS IN PRINTING DEVICES (71) Applicant: HEWLETT-PACKARD DEVELOPMENT COMPANY, L.P., Houston, TX (US)

(72) Inventors: Javier Gonzalez Bruno, Barcelona (ES); David Sala Porta, Barcelona (ES); David Soriano Fosas, Sant Cugat del Valles (ES); Vicente Granados Asensio, San Cugat del Valles (ES); Jose Francisco Bravo de Vega, Sant Cugat del Valles (ES)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 15/310,164

(22) PCT Filed: May 28, 2014

(86) PCT No.: PCT/US2014/039773
§ 371 (c)(1),
(2) Date: Nov. 10, 2016

(87) PCT Pub. No.: WO2015/183260
PCT Pub. Date: Dec. 3, 2015

(65) Prior Publication Data
US 2017/0182819 A1 Jun. 29, 2017

(51) Int. Cl.
*B41J 29/38* (2006.01)
*G06K 15/02* (2006.01)

(52) U.S. Cl.
CPC .......... *B41J 29/38* (2013.01); *G06K 15/1868* (2013.01)

(58) Field of Classification Search
CPC ............................. B41J 29/38; G06K 15/1868
See application file for complete search history.

(56) References Cited

U.S. PATENT DOCUMENTS 6,297,888 B1   10/2001  Noyes et al.
6,585,340 B1 *  7/2003  Borrell ................. B41J 2/17546
                                                                347/14
(Continued)

FOREIGN PATENT DOCUMENTS

EP          0674993          10/1995

OTHER PUBLICATIONS

Printers Certification Objectives. http://cuip.uchicago.edu/~jwoods/A+Book/Book/Chapter%205%20Printers/a+05cd.htm.

*Primary Examiner* — Bradley Thies
(74) *Attorney, Agent, or Firm* — HP Inc. Patent Department (57) ABSTRACT

Examples of a printing device, a method for use in a printing device, and a machine readable non-transitory storage medium including instructions relating to a printing device that are executable by a processor are disclosed herein. An example of the machine readable non-transitory storage medium includes instructions relating to a printing device that, when executed by a processor, cause the processor to: segment data for an image into a plurality of positions, analyze performance data regarding an actual portion of the image formed by each of a plurality of print heads, arrange the segmented image data for each portion of the image based on the performance data for each of the print heads, and transmit the arranged image data to each of the print heads so that each print head forms a correct portion of the image.

19 Claims, 8 Drawing Sheets

(56) References Cited

U.S. PATENT DOCUMENTS

| | | | |
|---|---|---|---|
| 7,014,289 | B1 | 3/2006 | Matsuda |
| 7,196,814 | B2 | 3/2007 | Silverbrook et al. |
| 8,007,063 | B2 | 8/2011 | Silverbrook et al. |
| 2002/0163551 | A1* | 11/2002 | Bruch .................... B41J 2/2132 347/15 |
| 2005/0073699 | A1* | 4/2005 | Silverbrook ........... B41J 2/0452 358/1.8 |
| 2006/0012806 | A1* | 1/2006 | Subirada ............. B41J 2/16579 358/1.8 |
| 2006/0125855 | A1* | 6/2006 | Silverbrook ......... G06K 15/102 347/9 |
| 2008/0259110 | A1 | 10/2008 | Korem et al. |
| 2009/0109450 | A1 | 4/2009 | Shino |
| 2009/0195580 | A1 | 8/2009 | Miyamoto |
| 2010/0165390 | A1 | 7/2010 | Nakamura et al. |
| 2012/0013674 | A1* | 1/2012 | Garcia ................... B41J 2/2132 347/19 |

\* cited by examiner

120 — Detecting droplets from each of the print heads to generate the test data regarding performance of each of the print heads

122 — Installing each of the print heads in a different port to arrange the print heads along the media path of the printing device

124 — Executing a set of instructions on a machine readable non-transitory storage medium via a processor to at least one of segment the image data for each portion of the image and arrange the segmented image data for each portion of the image based on the test data for each of the print heads

ARRANGING IMAGE DATA SEGMENTS IN PRINTING DEVICES

BACKGROUND

End users appreciate reliability and performance in printing devices. They also appreciate quality output and cost effective solutions for their printing needs. Designers and manufacturers may, therefore, endeavor to create and provide printing devices directed toward at least some of these objectives.

BRIEF DESCRIPTION OF THE DRAWINGS

The following detailed description references the drawings, wherein.

DETAILED DESCRIPTION

Use of multiple print heads in a printing device necessitates that each of these print heads are correctly coupled to the processor that generates the information for them to print. The print heads are located along a media path and the position of each print head determines which portion of an image is created during printing in a printzone. Each print head has an individual connection to the processor by, for example, cabling and/or a port, which sends specific image data to that print head based on the location of the print head. If there is a mismatch or error associated with any of these processor and print head connections, the completed printed image will be incorrect. For example, a top portion of an image may appear at the bottom position of a printed image and a bottom portion of an image may appear at the top position of a printed image. As other example, middle portions of an image may be switched in the middle positions of a printed image. In order to correct this issue, the print heads need to be properly reconnected to get the image correctly printed.

These mismatches or errors between processor and print head connections can occur, for example, during manufacture, repair and/or servicing of a printing device. One way in which these mismatches or errors may be detected and corrected is through the use of a printed diagnostic page or test image. Once this diagnostic page or test image is analyzed, an end user or technician then reconnects the print heads to the processor in the correct order or informs the processor of the results of this analysis so that the processor can rectify the mismatch or error. This approach adds complexity to the use of a printing device and may, in some cases, be frustrating or difficult for some end users or technicians. It may also be perceived as a waste of time by some end users.

Another approach to detect and correct these mismatches or errors is to individually distinguish each print head and its associated connection (e.g., cabling and port). This approach may utilize an identifying device or mechanism for each print head and associated connection (e.g., a label, color, mark, number, or other identifier) which adds cost and complexity to the manufacturing, assembly, and parts cost associated with a printing device.

Examples directed to detecting and correcting these print head and processor mismatches or errors are shown in FIGS. 1-8. These examples help to address the above-described issues associated with other approaches to detecting and correcting these mismatches or errors by eliminating end user or technician intervention, as well as cost and complexity associated with manufacturing, assembly, and parts of printing devices.

As used herein the term "printing device" represents a printer, plotter, press and/or device that uses any of the following marking technologies or a combination thereof: ink jet, dye sublimation, thermal transfer, 3D, laser, extrusion, off-set printing, or dot matrix. As used herein the terms "media" and "medium" are interchangeable and represent any type of paper or other printing medium (e.g., cloth, cardboard, canvas, transparency, substrate, etc.), having any type of finish on either or both sides (e.g., glossy, matte, plain, textured, etc.), in any size, shape, color, or form (e.g., sheet, roll (cut or uncut), folded, etc.) on which printing composition (e.g., ink, toner, colorant, wax, dye, powder, latex, printing fluid or solid, etc.) is placed, jetted, deposited, dropped, formed, or laid to create text or items (e.g., text, images, graphics, pictures, formulas, charts, two-dimensional objects, three-dimensional objects, etc.).

As used herein, the terms "print head" and "print heads" represent a mechanism or device that implements any of the above-described marking technologies. A print head or print heads can be a single device or mechanism, or arranged in a module or array such as, for example, a print bar or page-wide array. As used herein, the term "printzone" represents the area, location or portion a printing device where a printing mechanism utilizes printing composition to create images and/or items on a medium.

As used herein, the term "media path" represents the guide(s)), nip(s), chute(s), roller(s), motor(s), shaft(s), gear (s), control electronics and/or other structure used to advance and control the movement of media through a printzone. As used herein the term "multiplexor" represents a device and/or process that sorts, arranges, routes, reorders, shuffles, or transfers signals, data streams and/or information to a correct, appropriate or desired destination, location, route or path.

As used herein, the term "diagnostic module" represents a device, structure and/or process that generates, identifies or creates test or performance data or information regarding or for an item, device, object or portion thereof. A diagnostic module can be stationary or moveable and may utilize any type of sensor or detecting technology including, but not limited to, optical, capacitive, inductive, electrical, magnetic, or resistive.

As used herein, the term "processor" represents an instruction execution system such as a computer-based system, an Application Specific Integrated Circuit (ASIC), a computing device, a machine readable instruction system, print engine or any combination thereof that can fetch or obtain the logic from a non-transitory storage medium and execute the instructions contained thereon. "Processor" can also include any controller, state-machine, microprocessor, logic control circuitry, cloud-based utility, service or feature, any other analogue, digital and/or mechanical implementation thereof, or any combination of the forgoing.

As used herein, the term "machine readable non-transitory storage medium" represents any device that can contain, store, retain, or maintain programs, code, scripts, information, and/or data. A machine readable non-transitory storage medium can include any one of many physical storage media such as, for example, electronic, magnetic, optical, electromagnetic, or semiconductor storage media. A non-volatile storage medium can be a component of a distributed system. More specific examples of suitable non-volatile storage media include, but are not limited to, a magnetic computer diskette such as floppy diskettes or hard drives, magnetic tape, a read-only memory (ROM), an erasable programmable read-only memory (EPROM), a flash drive or memory, a compact disc (CD), a digital video disk (DVD), or a memristor.

Figure 1:
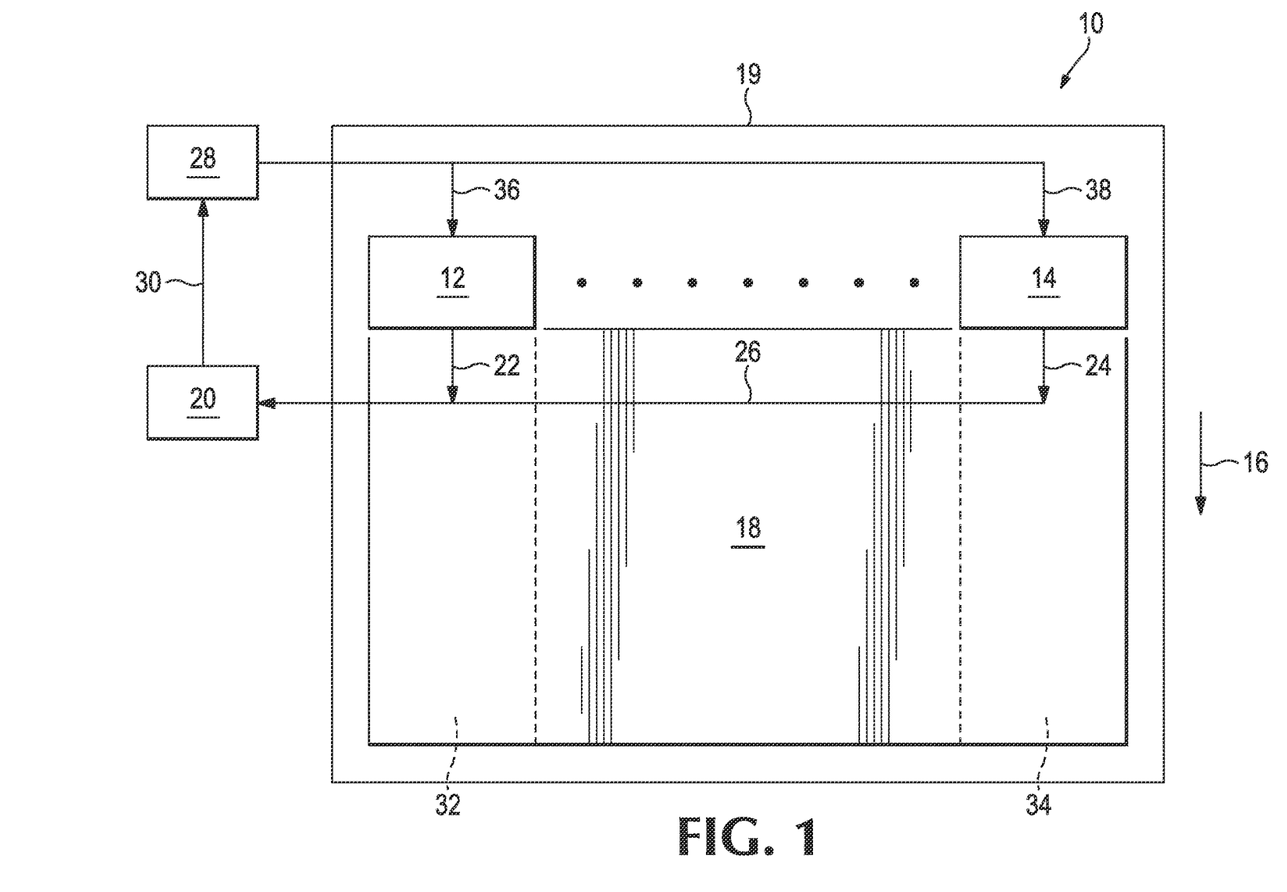
FIG. 1 is an example of a printing device.

An example of a printing device 10 is shown in FIG. 1. As can be seen in FIG. 1, printing device 10 includes a plurality of print heads 12 through 14 along a media path, generally represented by arrow 16, of printing device 10 to form an image 18 on a medium 19. Each of print heads 12 through 14 occupies a different position along media path 16 to form a portion of image 18. Printing device 10 also includes a diagnostic module 20 that identifies performance data for each of print heads 12 through 14, as generally represented by arrows 22, 24, and 26. This performance data can be related to operational characteristics of print heads 12 through 14 including, without limitation, the color, size and/or amount of printing composition being utilized by print heads 12 through 14 to create image portions 32 through 34 or the composition, color or other characteristics of image portions 32 through 34 created by respective print heads 12 through 14.

As can also be seen in FIG. 1, printing device 10 additionally includes a processor 28 to receive the performance data from diagnostic module 20 for each of print heads 12 through 14, as generally represented by arrow 30. Processor 28 segments image data for each portion of image 18, as represented by image portions 32 through 34, and arranges the segmented image data for each portion image 18 based on the performance data for each of print heads 12 through 14. For example, if processor 28 determines, based on the performance data from diagnostic module 20, that print head 12 will print image portion 34 of image 18 based on its misconnection to processor 28, then processor 28 can rearrange the segmented image data so that print head 12 will actually print intended image portion 32 instead, Processor 28 then transmits the arranged image data to each of print heads 12 through 14 so that each print head 12 through 14 forms a correct portion of image 18, as generally indicated by arrows 36 through 38.

Figure 2:
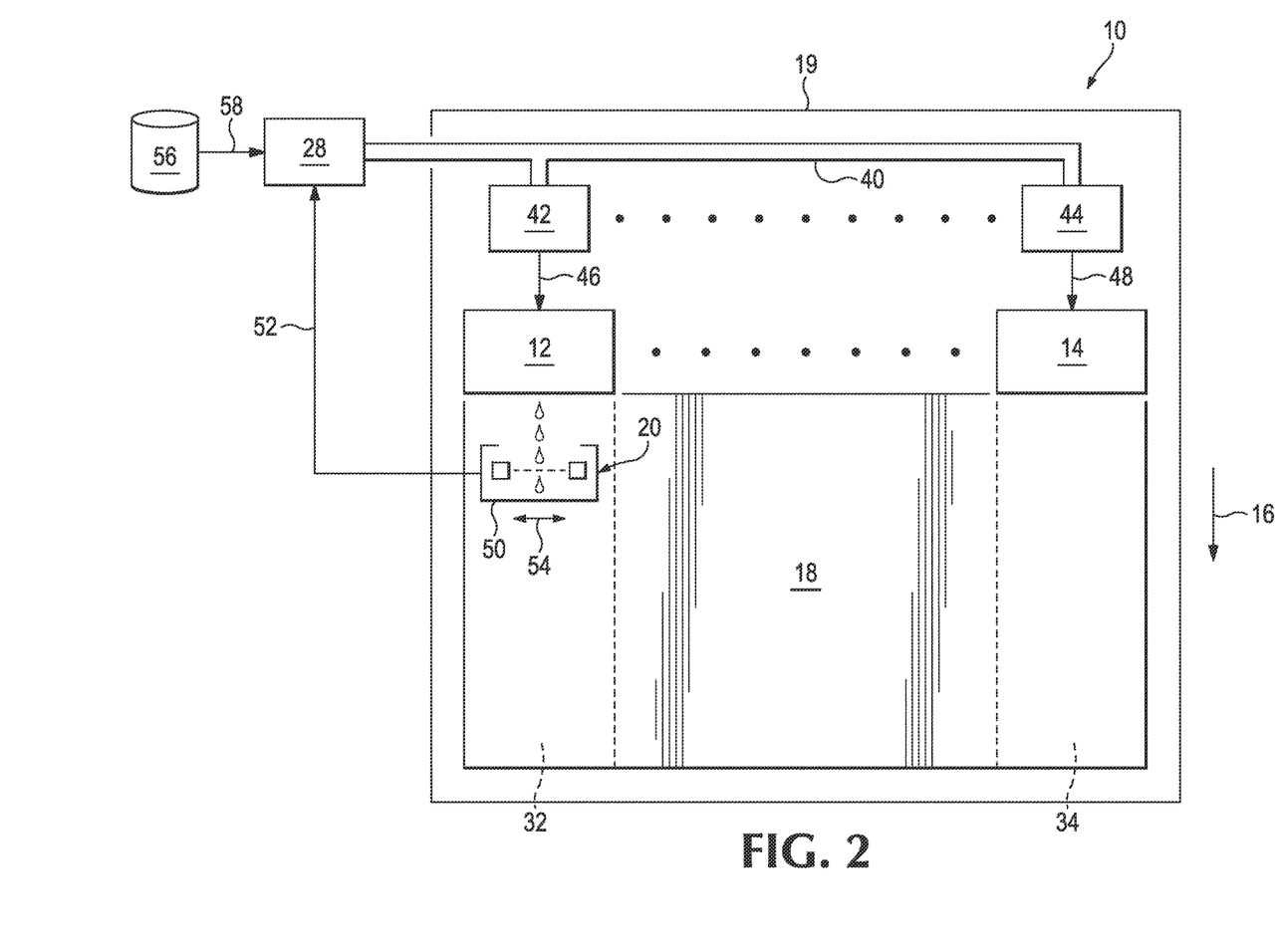
FIG. 2 is an example of additional elements of the printing device of FIG. 1.

An example of additional elements of printing device 10 is shown in FIG. 2. As can be seen in FIG. 2, printing device 10 may include a data pipeline 40 coupled to processor 28 and each of print heads 12 through 14 to transmit image data from processor 28 to each of print heads 12 through 14. Alternatively or additionally, printing device 10 may include a plurality of ports 42 through 44 to position each of print heads 12 through 14 along media path 16. Ports 42 through 44 are coupled to respective print heads 12 through 14, as generally indicated by respective arrows 46 through 48, as well as data pipeline 40.

As can also be seen in FIG. 2, diagnostic module 20 may include an optical drop detector 50 coupled to processor 28, as generally indicated by arrow 52. Optical drop detector 46 is movable in either of the directions indicated by double-headed arrow 54 so that optical drop detector 50 may be positioned adjacent each of print heads 12 through 14. Although not shown, it is to be understood that in other examples of printing device 10, diagnostic module 20 may be stationary rather than moveable. For example, a separate optical drop detector 50 may be attached to each of print heads 12 through 14.

As can further be seen in FIG. 2, printing device 10 may alternatively or additionally include a machine readable non-transitory storage medium 56 including instructions executable by processor 28, as generally indicated by arrow 58. These instructions, when executed by processor 28, cause processor 28 to segment image data for each image portion 32 through 34 and/or arrange the segmented image data for each image portion 32 through 34 based on performance data for each of print heads 12 through 14.

Figure 3:
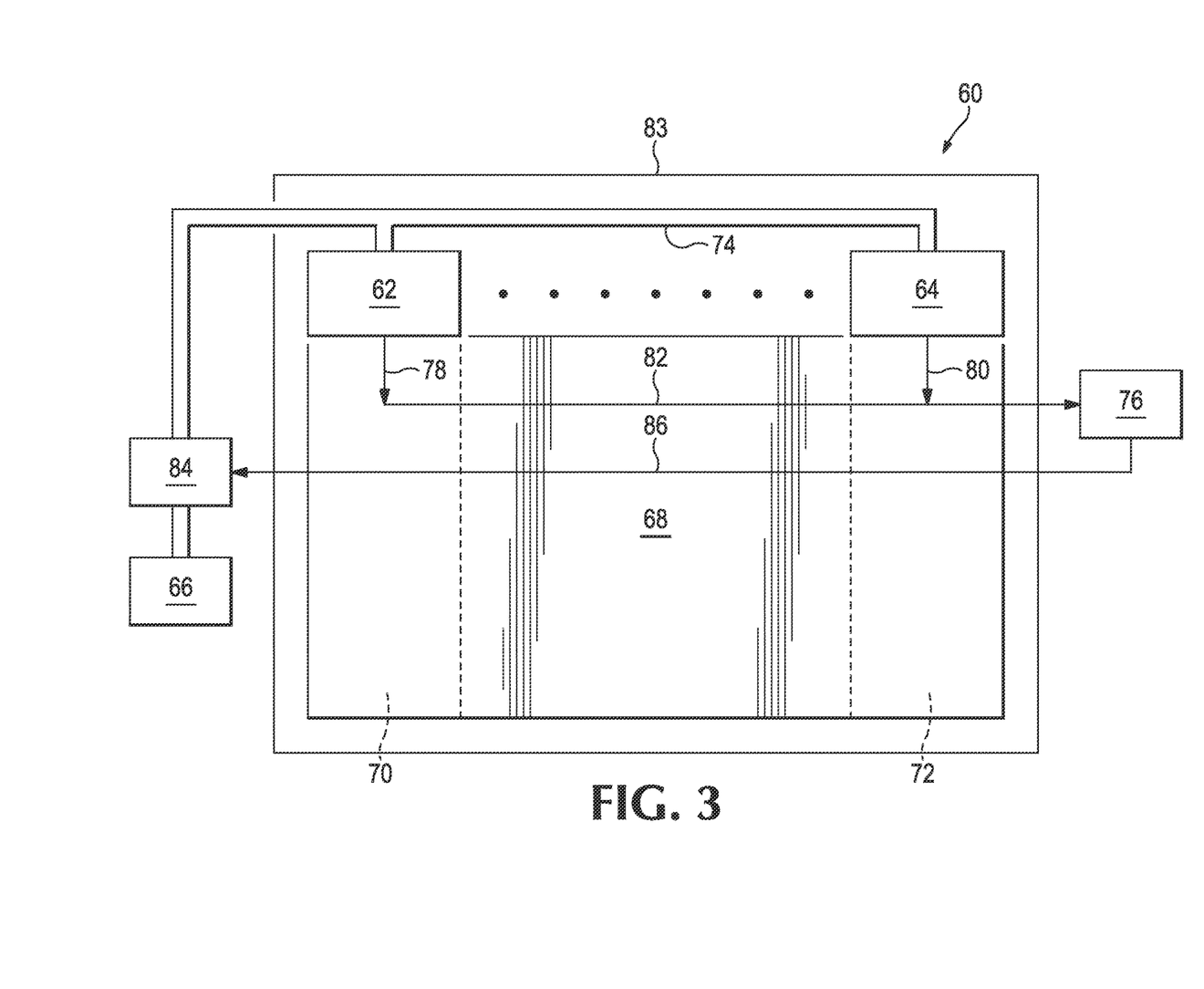
FIG. 3 is an example of another printing device.

An example of another printing device 60 is shown in FIG. 3. As can be seen in FIG. 3, printing device 60 includes a plurality of print heads 62 through 64 and a processor 66 to segment data for an image 68 into a plurality of portions 70 through 72. Printing device 60 also includes a data pipeline 74 to couple processor 66 and each of the print heads 62 through 64, and a diagnostic module 76 to generate test data, generally represented by arrow 78, 80, and 82, regarding an actual portion of image 68 formed on medium 83 by each of print heads 62 through 64 based on the data pipe line 74 connection for that print head. This test data can be related to operational characteristics of print heads 62 through 64 including, without limitation, the color, size and/or amount of printing composition being utilized by print heads 62 through 64 to create image portions 70 through 72 or the composition, color or other characteristics of image portions 70 through 72 created by respective print heads 62 through 64.

As can also be seen in FIG. 3, printing device 60 additionally includes a multiplexor 84 coupled to data pipeline 74 to receive segmented image data from processor 66 and to route the segmented image data to each of print heads 62 through 64 based on the test data from diagnostic module 76, as generally indicated by arrow 86, so that each of print heads 62 through 64 forms a correct portion of image 68. For example, if multiplexor 84 determines, based on the test data from diagnostic module 76, that print head 64 will print image portion 70 of image 68 based the coupling of print head 64 and processor 66 via data pipeline 74, then multiplexor 84 changes the arrangement of the segmented image data from processor 66, so that print head 64 will actually print intended image portion 72 instead. Multiplexor 84 then routes the arranged image data to each of print heads 62 through 64 so that each print head 62 through 64 forms a correct portion of image 68.

Figure 4:
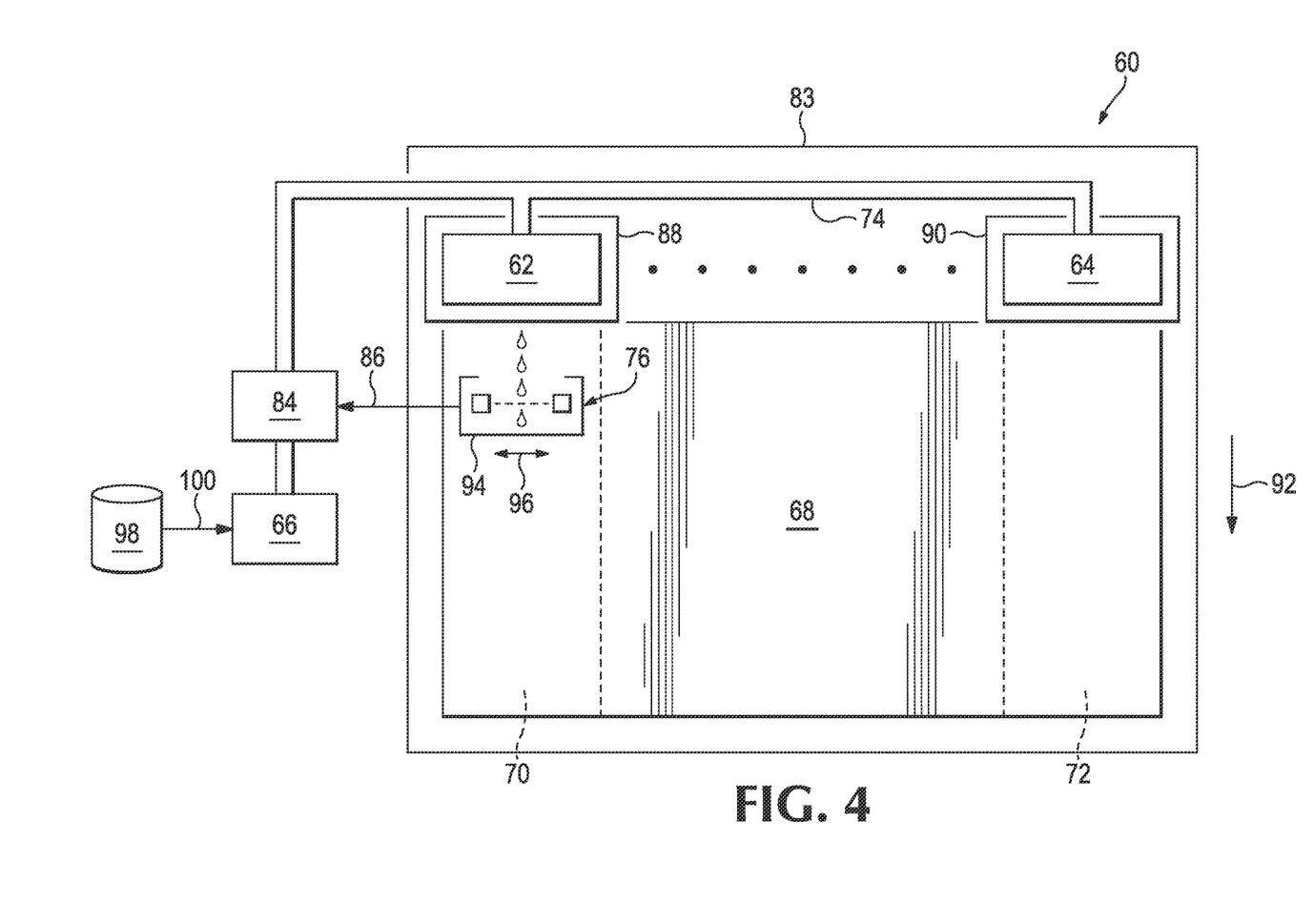
FIG. 4 is an example of additional elements of the printing device of FIG. 3.

An example of additional elements of printing device 60 is shown in FIG. 4. As can be seen in FIG. 4, printing device 60 may include a plurality of ports 88 through 90 to position respective print heads 62 through 64 along media path 92. In this example, print heads 62 through 64 are disposed in respective ports 88 through 90 which are coupled to data pipeline 74.

As can also be seen in FIG. 2, diagnostic module 76 may include an optical drop detector 94 coupled to multiplexor 84, as generally indicated by arrow 86. Optical drop detector 94 is movable in either of the directions indicated by double-headed arrow 96 so that optical drop detector 94 may be positioned adjacent each of print heads 62 through 64. Although not shown, it is to be understood that in other examples of printing device 60, diagnostic module 76 may be stationary rather than moveable. For example, a separate optical drop detector 94 may be attached to each of print heads 62 through 64.

As can additionally seen in FIG. 3, printing device 60 may alternatively or additionally include a machine readable non-transitory storage medium 98 including instructions executable by processor 66, as generally indicated by arrow 100. These instructions, when executed by processor 66, cause processor 66 to segment image data for each image portion 70 through 72.

Figure 5:
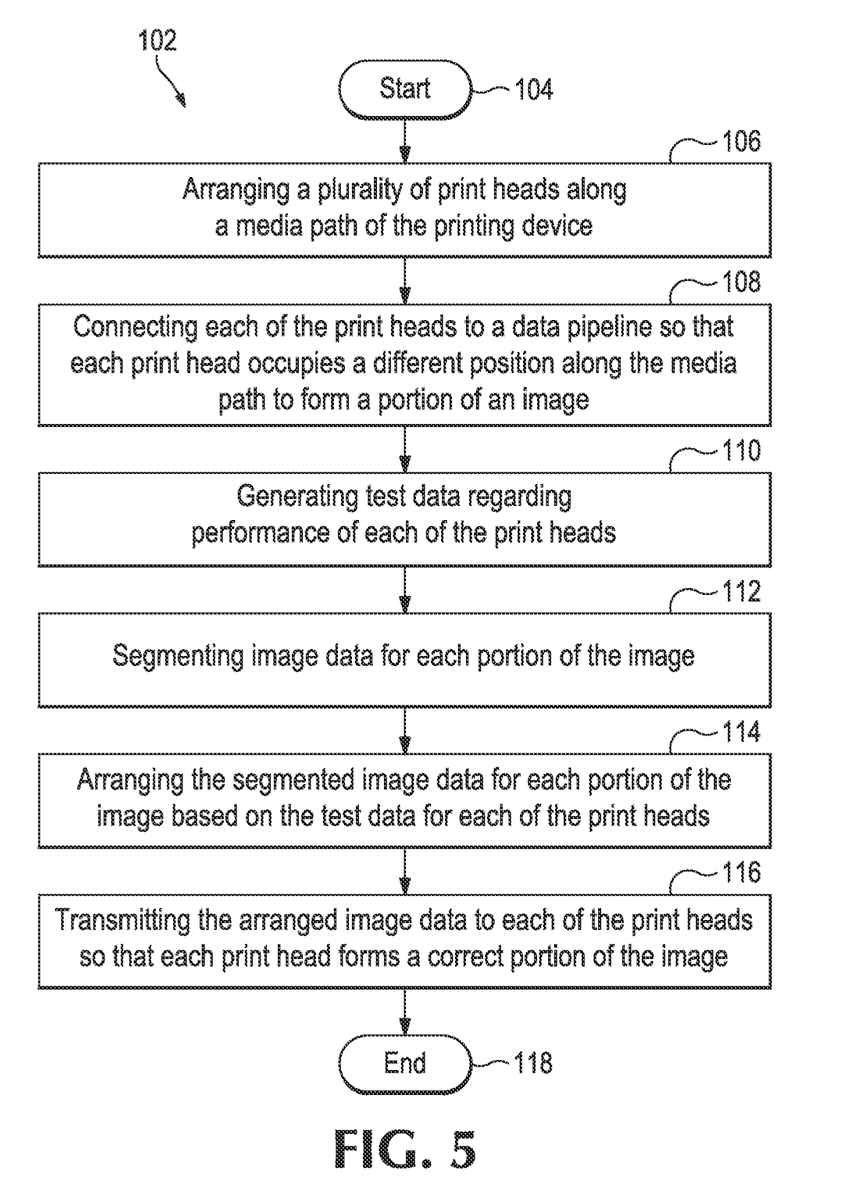
FIG. 5 is an example of a method for use in a printing device.

An example of a method 102 for use in a printing device is shown in FIG. 5. As can be seen in FIG. 5, method 102 starts 104 by arranging a plurality of print heads along a media path of the printing device, as indicated by block 106, and connecting each of the print heads to a data pipeline so that each print head occupies a different position along the media path to form a portion of an image, as indicated by block 108. Method 102 continues by generating test data regarding performance of each of the print heads, as indicated by block 110, and segmenting image data for each portion of the image, as indicated by block 112. Method 102 additionally continues by arranging the segmented image data for each portion of the image based on the test data for each of the print heads, as indicated by block 114, and transmitting the arranged image data to each of the print heads so that each print head forms a correct portion of the image, as indicated by block 116. Method 102 then ends 118.

Figure 6:
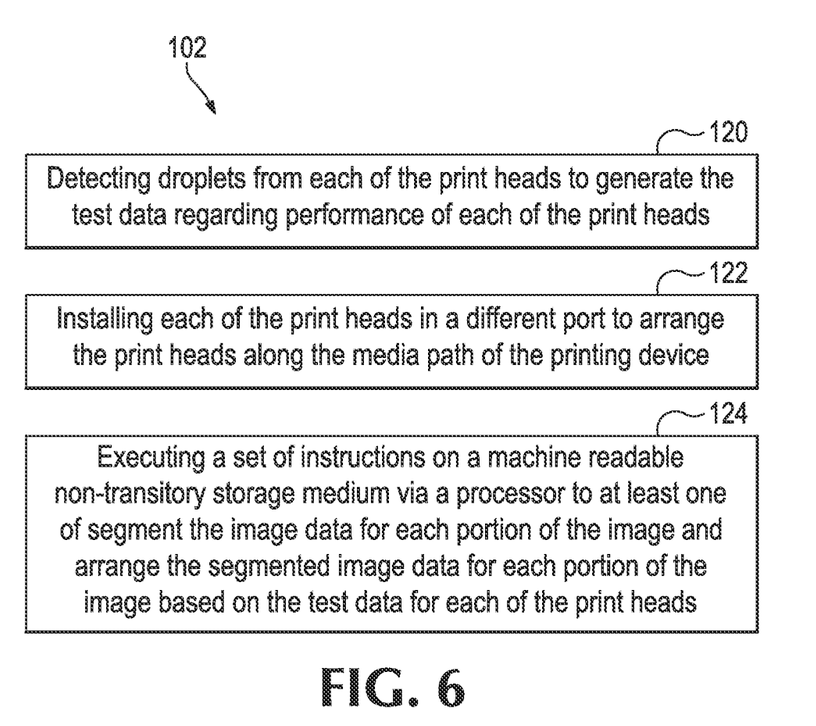
FIG. 6 is an example of additional elements for the method for use in a printing device of FIG. 5.

An example of additional elements for the method 102 for use in a printing device is shown in FIG. 6. As can be seen in FIG. 6, method 102 may also include detecting droplets from each of the print heads to generate the test data regarding performance of each of the print heads, as indicated by block 120. Alternatively, or additionally, method 102 may include installing each of the print heads in a different port to arrange the print heads along the media path of the printing device, as indicated by block 122. Still further alternatively or additionally, method 102 may include executing a set of instructions on a machine readable non-transitory storage medium via a processor to segment the image data for each portion of the image and/or arrange the segmented image data for each portion of the image based on the test data for each of the print heads, as indicated by block 124.

Figure 7:
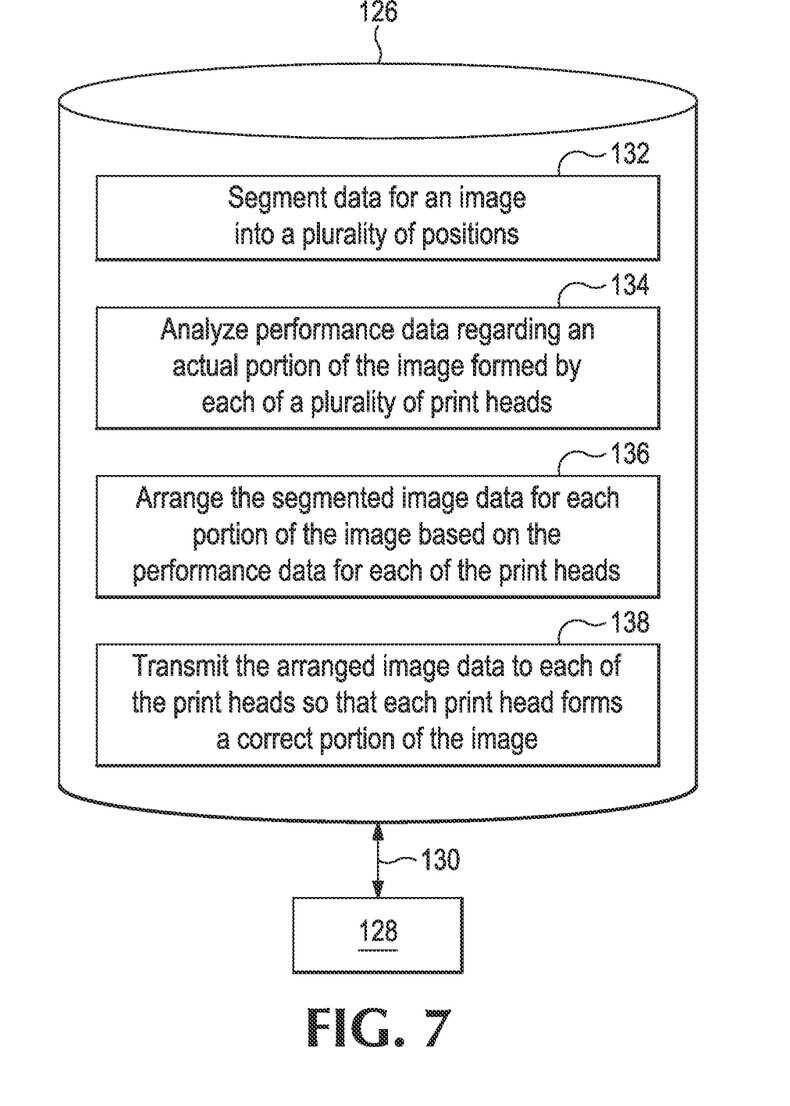
FIG. 7 is an example of a machine readable non-transitory storage medium that includes instructions relating to a printing device executable by a processor.

An example of a machine readable non-transitory storage medium 126 that includes instructions relating to a printing device executable by a processor 128, as generally indicated by double-headed arrow 130, is shown in FIG. 7. As can be seen in FIG. 7, machine readable non-transitory storage medium 126 includes instructions relating to a printing device that, when executed by a processor 128, cause processor 128 to segment data for an image into a plurality of positions, as indicated by block 132, and to analyze performance data regarding an actual portion of the image formed by each of a plurality of print heads, as indicated by block 134. As can also be seen in FIG. 7, machine readable non-transitory storage medium 126 includes instructions relating to a printing device that, when executed by a processor 128, cause the processor 128 to arrange the segmented image data for each portion of the image based on the performance data for each of the print heads, as indicated by block 136, and transmit the arranged image data to each of the print heads so that each print head forms a correct portion of the image, as indicated by block 138.

Figure 8:
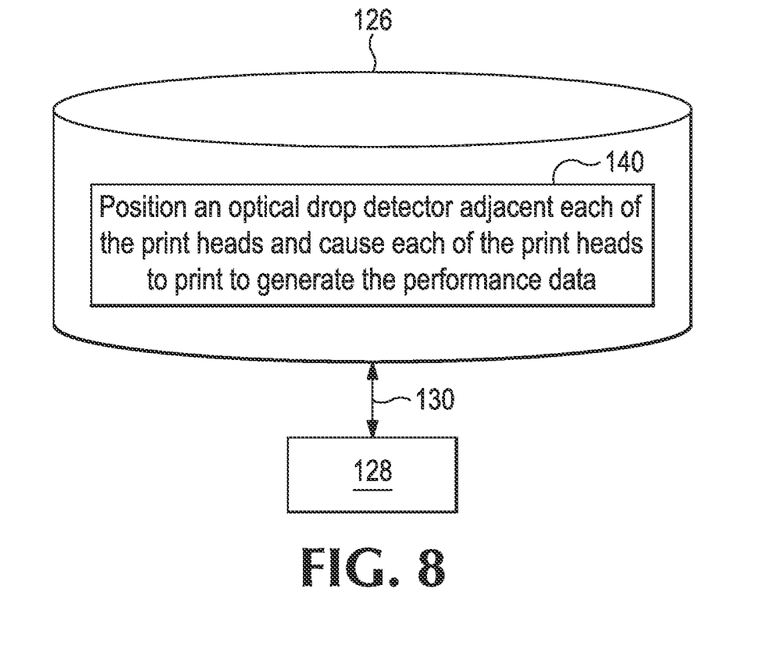
FIG. 8 is an example of additional instructions on the machine readable non-transitory storage medium of FIG. 7 that are executable by the processor.

An example of additional instructions on machine readable non-transitory storage medium 126 that are executable by the processor 128 is shown in FIG. 8. As can be seen in FIG. 8, machine readable non-transitory storage medium 126 may include additional instructions relating to a printing device that, when executed by processor 128, cause processor 128 to position an optical drop detector adjacent each of the print heads and cause each of the print heads to print to generate the performance data, as indicated by block 140.

Although several drawings have been described and illustrated in detail, it is to be understood that the same are intended by way of illustration and example. These examples are not intended to be exhaustive or to be limited to the precise form disclosed. Modifications and variations may well be apparent. For example, the apparatuses, methods, and instructions on a machine readable non-transitory storage medium disclosed and described herein may be utilized or performed automatically during initialization of a printing device or on demand by an end user or technician as part of an auto diagnostic system or manufacturing, routine. As another example, the results obtained from utilization of the apparatuses, methods, and instructions on a machine readable non-transitory storage medium disclosed and described herein may be stored and retrieved for use during subsequent power-ups of a printing device, thereby saving initialization time. As a further example, although just two print heads have been shown in FIGS. 14, it is to be understood that any number of print heads may be utilized. Additionally, the print heads may be arranged in any manner or orientation including, without limitation, side-by-side in a single row as shown in FIGS. 14, in multiple rows or staggered.

Additionally, reference to an element in the singular is not intended to mean one, unless explicitly so stated, but rather means at least one. Furthermore, unless specifically stated, any method elements are not limited to the sequence or order described and illustrated. Moreover, no element or component is intended to be dedicated to the public regardless of whether the element or component is explicitly recited in the following claims.

What is claimed is:

1. A printing device, comprising:
   a plurality of print heads to form an image on a medium, each print head occupying a respective different position with respect to the medium to form a respective portion of the image;
   a diagnostic module to identify performance data for each of the print heads;
   a processor to:
      receive the performance data for each of the print heads from the diagnostic module,
      segment image data into a plurality of image data segments for the respective portions of the image,
      arrange the image data segments based on the performance data for each of the print heads, the arranging comprising changing an order of the image data segments from a first order of the image data segments to a different second order of the image data segments if the performance data indicates a misconnection of the plurality of print heads in the printing device, and
      transmit the arranged image data segments to the print heads so that each print head forms the respective portion of the image; and
   a plurality of ports to position respective print heads of the plurality of print heads with respect to the medium, wherein the first order of the image data segments corresponds to a first connection arrangement of the plurality of print heads to the plurality of ports, and the second order of the image data segments corresponds to a different second connection arrangement of the plurality of print heads to the plurality of ports.

2. The printing device of claim 1, further comprising a data pipeline coupled to the processor to transmit the image data segments to the plurality of print heads.

3. The printing device of claim 1, wherein the diagnostic module includes an optical drop detector.

4. The printing device of claim 1, further comprising a machine readable non-transitory storage medium including instructions that, when executed by the processor, cause the processor to segment the image data into the plurality of image data segments, and arrange the image data segments based on the performance data.

5. The printing device of claim 1, wherein the misconnection of the plurality of print heads causes a first print head of the plurality of print heads to print an incorrect portion of the image onto the medium if the first order of the image data segments is used.

6. The printing device of claim 1, wherein the plurality of print heads has a print head order with respect to the medium, and the misconnection causes the plurality of print heads to print the portions of the image in an order that deviates from the print head order if the first order of the image data segments is used.

7. The printing device of claim 6, wherein the plurality of print heads are to print the portions of the image in the print head order if the second order of the image data segments is used.

8. A printing device, comprising:
a plurality of print heads;
a processor to segment image data for an image into a plurality of image data portions;
a data pipeline to couple the processor and the plurality of print heads;
a diagnostic module to generate test data regarding an actual image data portion of the image formed by each respective print head of the plurality of print heads based on a data pipeline connection of the respective print head; and
a multiplexor coupled to the data pipeline to receive the image data portions from the processor and to selectively route the image data portions to the plurality of print heads based on the test data from the diagnostic module, the selective routing of the image data portions by the multiplexor comprising:
routing a first order of the image data portions to the plurality of print heads in response to the test data indicating no misconnection of the plurality of print heads to the data pipeline in which the plurality of print heads are connected to the data pipeline in a target order, and
routing a different second order of the image data portions to the plurality of print heads in response to the test data indicating a misconnection of the plurality of print heads to the data pipeline in which the plurality of print heads are connected to the data pipeline in an order different from the target order.

9. The printing device of claim 8, further comprising a plurality of ports to position the print heads with respect to a medium onto which the image is to be printed.

10. The printing device of claim 8, wherein the diagnostic module includes an optical drop detector.

11. The printing device of claim 8, further comprising a machine readable non-transitory storage medium including instructions that, when executed by the processor, cause the processor to segment the image data into the plurality of image data portions.

12. A method for use in a printing device, comprising:
arranging a plurality of print heads with respect to a medium onto which an image is to be printed;
connecting the plurality of print heads to a data pipeline so that each print head occupies a different position along the medium to form a respective portion of the image;
generating test data regarding performance of each of the plurality of print heads;
segmenting image data for the image into a plurality of image data segments that correspond to the respective portions of the image;
arranging the image data segments based on the test data for each of the plurality of print heads, the arranging comprising changing an order of the image data segments from a first order of the image data segments to a different second order of the image data segments if the test data indicates a misconnection of the plurality of print heads to the data pipeline, the misconnection of the plurality of print heads comprising the plurality of print heads connected to the data pipeline in an order different from a target order of connection of the plurality of print heads to the data pipeline, the first order of the image data segments to be used responsive to the plurality of print heads being connected to the data pipeline in the target order; and
transmitting the arranged image data segments to the plurality of print heads so that each print head forms the respective portion of the image.

13. The method of claim 12, further comprising detecting droplets from each of the plurality of print heads to generate the test data regarding performance of each of the plurality of print heads.

14. The method of claim 12, further comprising installing each of the plurality of print heads in a different port to arrange the plurality of print heads with respect to the medium.

15. The method of claim 12, further comprising executing a set of instructions on a machine readable non-transitory storage medium via a processor to segment the image data into the image segments and arrange the image data segments based on the test data for each of the plurality of print heads.

16. The method of claim 12, wherein the plurality of print heads has a print head order with respect to the medium, and the misconnection causes the plurality of print heads to print the portions of the image in an order that deviates from the print head order if the first order of the image data segments is used.

17. The method of claim 16, wherein the plurality of print heads are to print the portions of the image in the print head order if the second order of the image data segments is used.

18. A machine readable non-transitory storage medium comprising instructions relating to a printing device that, when executed by a processor, cause the processor to:
segment data for an image into a plurality of image data portions;
analyze performance data regarding an actual portion of the image formed by each of a plurality of print heads;
arrange the image data portions based on the performance data for each of the plurality of print heads, the arranging comprising:

using a first order of the image data portions responsive to the plurality of print heads being connected to a data pipeline in a target order, and using a different second order of the image data portions responsive to the performance data indicating a misconnection of the plurality of print heads in the printing device in which the plurality of print heads are connected to the data pipeline in an order different from the target order; and transmit the arranged image data portions to the plurality of print heads so that each print head forms a correct portion of the image.

19. The machine readable non-transitory storage medium of claim 18, further comprising additional instructions that, when executed by the processor, cause the processor to position an optical drop detector adjacent each of the print heads and cause each of the print heads to print to generate the performance data.

* * * * *

UNITED STATES PATENT AND TRADEMARK OFFICE
CERTIFICATE OF CORRECTION

PATENT NO. : 10,052,897 B2
APPLICATION NO. : 15/310164
DATED : August 21, 2018
INVENTOR(S) : Javier Gonzalez Bruno et al.

Page 1 of 1

It is certified that error appears in the above-identified patent and that said Letters Patent is hereby corrected as shown below:

On the Title Page

In item (72), Inventors, in Column 1, Line 5, delete "San Cugat del Valles(ES)" and insert --Sant Cugat del Valles (ES) --, therefor.

Signed and Sealed this
Ninth Day of April, 2019

Andrei Iancu
*Director of the United States Patent and Trademark Office*